United States Patent [19]

Kamata et al.

[11] Patent Number: 4,611,810
[45] Date of Patent: Sep. 16, 1986

[54] GOLF BALL

[75] Inventors: Toshihiko Kamata, Kagawa; Shunji Izumi, Okayama; Kazuo Irimajiri; Setsuji Edagawa, both of Kochi, all of Japan

[73] Assignees: Toyo Denka Kogyo Co., Ltd., Kochi; Kamatari Co., Ltd., Kagawa, both of Japan

[21] Appl. No.: 738,543

[22] Filed: May 28, 1985

[30] Foreign Application Priority Data

Dec. 2, 1982 [JP] Japan ................................ 57-210629

[51] Int. Cl.$^4$ ............................................. A63B 37/00
[52] U.S. Cl. ................................ 273/218; 273/DIG. 1
[58] Field of Search ................... 273/218, 235 R, 220, 273/221, 228, 229, 230, 217

[56] References Cited

U.S. PATENT DOCUMENTS

| 4,056,269 | 11/1977 | Pollitt et al. | 273/DIG. 10 X |
| 4,076,255 | 2/1978 | Moore et al. | 273/230 X |
| 4,085,937 | 4/1978 | Schenk | 273/230 X |
| 4,141,559 | 2/1979 | Melvin et al. | 273/235 R X |
| 4,244,855 | 1/1981 | Cox et al. | 273/231 X |
| 4,295,652 | 10/1981 | Saito et al. | 273/235 R |
| 4,321,183 | 3/1982 | Cox et al. | 273/230 X |

OTHER PUBLICATIONS

"Introduction to Rubber Technology", by Maurice Norton, Reinhold Publishing Corp., N.Y., 1959, pp. 224-227 Relied on.

Primary Examiner—George J. Marlo
Attorney, Agent, or Firm—Oblon, Fisher, Spivak, McClelland & Maier

[57] ABSTRACT

A golf ball having compression strength greater than 7000 kg-f and rebound height greater than 90/120, said golf ball comprising a rubber composition filled with 10 to 40 parts by weight of calcium carbonate based on 100 parts by weight of the rubber, the calcium carbonate having a BET specific surface area of 60 to 300 m$^2$/g and a particle diameter of 0.035 to 0.010 micrometers.

1 Claim, 2 Drawing Figures

GOLF BALL

This application is a continuation of application Ser. No. 557,437, filed Dec. 2, 1983 now abandoned.

FIELD OF THE INVENTION

The present invention relates to a golf ball, and more particularly, to a golf ball made of a rubber composition filled with calcium carbonate.

BACKGROUND OF THE INVENTION

Golf balls fall into three categories according to their structure. First, the three-layered ball consisting of a core of high-density synthetic rubber, a stretched rubber band wound around the core, and a cover. Second, the one-piece ball solidly made of synthetic rubber, with dimples formed on the surface. Third, the two-piece ball made up of a core of synthetic rubber and a cover of ionomer resin or the like. In addition to these three types of balls, there is conceivable the three-piece ball or multi-layered ball consisting of three or more layers, each having different degree of elasticity.

The two-piece ball is improved in durability owing to the covering layer made of ionomer resin ("Surlyn", a product of Du Pont, U.S.A.), which transmits the rebound resilience and rigidity of the core and protects the ball from damage and deformation, thanks to its outstanding strength and hardness.

The core of the two-piece ball is required to be improved in rebound resilience that affects the flight distance and breaking strength that relates to durability. Moreover, the core determines what the player feels when he makes a shot and provides the pleasant sound the ball produces when it is hit.

The core is typically made of polybutadiene rubber covulcanized with an acrylic ester or a metal salt of polymerizable organic acid. The rubber is incorporated with several kinds of fillers so that the ball meets the standards and the ball has the desired flight distance and durability. According to the Rules of the U.S. Professional Golfers' Association, the Rules of the British Professional Golfers' Association, and Japanese Industrial Standard JIS S7005-1955, the diameter is fixed at 42.67 mm (min) and the weight at 45.9 g (max) for American size balls, and the diameter is fixed at 41.15 mm (min) and the weight at 45.9 g (max) for British size balls. Major fillers in use for golf balls are white carbon and zinc oxide. Calcium carbonate, which is used in large quantities for natural rubber, SBR, and other rubbers, is not used in the production of golf balls because it does not impart the required rebound resilience and durability to golf balls.

It has been known that precipitated colloidal calcium carbonate having the BET specific surface area of 20 to 60 square meters per gram ($m^2/g$) improves the rebound resilience of butadiene rubber (BR) when incorporated into BR; but it has not been put to practical use because the rubber incorporated with it is low in compression strength. In the meantime, such fine calcium carbonate is produced by calcining limestone at about 1000° C. to give CaO, hydrating CaO to give a suspension of Ca(OH)$_2$, and introducing carbon dioxide gas into the suspension.

The present inventors found that a rubber compound filled with extremely fine calcium carbonate having a BET specific surface area greater than 60 $m^2/g$ can be advantageously used for making the cores of two-piece golf balls. The cores made of this rubber compound are made into golf balls having compression strength greater than 7000 kilograms of force (kg-f). Golf balls having the core made of the conventional rubber compound filled with white carbon or the above-mentioned precipitated calcium carbonate has compression strength of 2000 to 5000 kg-f. Moreover, the golf ball of this invention has a long flight distance, gives good feeling to the player when hit, and produces a pleasant sound when hit.

SUMMARY OF THE INVENTION

It is an object of this invention to provide a golf ball having compression strength greater than 7000 kg-f and rebound height greater than 90/120, said golf ball comprising a rubber composition filled with more than 10 to as much as 40 parts by weight of calcium carbonate based on 100 parts by weight of the rubber.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE INVENTION

Figure 1:
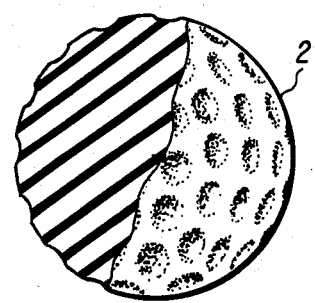
FIG. 1 shows a one piece golf ball, partially in section.
Figure 2:
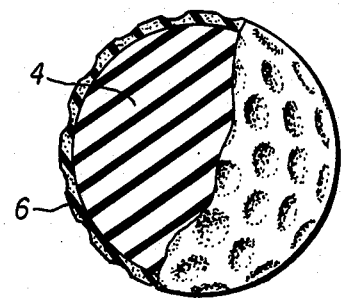
FIG. 2 shows a two piece golf ball, partially in section.

The compression strength of the golf ball is a load in kg of force required until a golf ball breaks when compressed at a rate of 2 mm/minute. It was measured according to ASTM D-575 by using a universal tester, Model 10t, made by Toyo Seiki Seisakusho. The rebound height is a height in cm to which a golf ball rebounds when dropped on a steel plate from a height of 120 cm. It was measured according to JIS S7005-1955.

The carry (flight distance) and the run (the distance a golf ball travels after touching the ground) of golf balls were measured by using a test machine trademarked "Golfer" made by Columbia Co., Ltd. in U.S.A. This test machine is designed to make a shot repeatedly in almost the same way as a skilled player does. It has a mechanism to adjust the speed of the golf club head to 45 to 50 m/sec (49.2 to 54.7 yards/sec), 40 to 45 m/sec (43.7 to 49.2 yards/sec), and 35 to 40 m/sec (38.3 to 43.7 yards/sec), each corresponding to the speed achieved by professional golfers, experienced amateur golfers, and beginner golfers.

The golf ball 2 of this invention, or the core 4 in the case of a two piece golf ball comprises a rubber composition incorporated with colloidal calcium carbonate having a BET specific surface area of 60 to 300 $m^2/g$, preferably 75 to 150 $m^2/g$, and a particle diameter of 0.035 to 0.010 μm, preferably 0.020 to 0.015 μm, as measured under an electron microscope. Where the rubber composition is used for the core 4 of a two-piece golf ball made up of a core 4 and a skin layer 6, the golf ball exhibits unexpectedly high compression strength (7000 kg-f and up) and rebound height (90/120 and up).

The calcium carbonate-filled rubber composition can be advantageously used for one-piece golf balls as well as cores of two-piece golf balls.

The invention is described in more detail with reference to the following examples.

Examples of the recipe for the calcium carbonatefilled rubber composition are given below.

| Recipe for Cores of British Size Golf Balls | | | | | | | | | | | |
|---|---|---|---|---|---|---|---|---|---|---|---|
| | | | | | | | | | Unit: parts by weight | | |
| Polybutadiene rubber*1 | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 |
| Zinc methacrylate*2 | 40 | 40 | 40 | 40 | 40 | 40 | 40 | 40 | 40 | 40 | 40 |
| Dicumyl peroxide | 2 | 2 | 2 | 2 | 2 | 2 | 2 | 2 | 2 | 2 | 2 |
| Sulfur | 0.1 | 0.1 | 0.1 | 0.1 | 0.1 | 0.1 | 0.1 | 0.1 | 0.1 | 0.1 | 0.1 |
| Fillers | | | | | | | | | | | |
| Calcium carbonate*3 | 10 | 15 | 30 | 40 | 50 | | | | | | |
| Calcium carbonate*4 | | | | | | 15 | 30 | 40 | | | |
| White carbon*5 | | | | | | | | | 15 | 30 | 40 |
| Barium sulfate | 37 | 34 | 25 | 20 | 15 | 34 | 25 | 20 | 35 | 27 | 22 |
| Total | 195.1 | 187.1 | 203.1 | 208.1 | 213.1 | 197.1 | 203.1 | 208.1 | 198.1 | 205.1 | 210.1 |

*1BR-01, made by Japan Synthetic Rubber Co., Ltd.
*2SK-30, made by Sanshin Kagaku K.K.
*3Colloidal calcium carbonate having a BET specific surface area of 80 m²/g, grade TF, made by Toyo Denka Co., Ltd.
*4Commercial precipitated calcium carbonate, grade PC, made by Shiraishi Kogyo K.K.
*5Commercial product, grade VN3, made by Nippon Silica Kogyo K.K.

| Recipe for Cores of American Size Golf Balls | | | | | | | | | | |
|---|---|---|---|---|---|---|---|---|---|---|
| | | | | | | | | | Unit: parts by weight | |
| Polybutadiene rubber*1 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Zinc methacrylate*2 | 40 | 40 | 40 | 40 | 40 | 40 | 40 | 40 | 40 | 40 |
| Dicumyl peroxide | 2 | 2 | 2 | 2 | 2 | 2 | 2 | 2 | 2 | 2 |
| Sulfur | 0.5 | 0.5 | 0.5 | 0.5 | 0.5 | 0.5 | 0.5 | 0.5 | 0.5 | 0.5 |
| Fillers | | | | | | | | | | |
| Calcium carbonate*3 | 5 | 10 | 15 | 20 | | | | | | |
| Calcium carbonate*4 | | | | | 5 | 10 | 15 | | | |
| White carbon*5 | | | | | | | | 5 | 15 | 20 |
| Total | 153.5 | 158.5 | 163.5 | 168.5 | 153.5 | 158.5 | 163.5 | 153.5 | 163.5 | 168.5 |

*1BR-01, made by Japan Synthetic Rubber Co., Ltd.
*2SK-30, made by Sanshin Kagaku K.K.
*3Colloidal calcium carbonate having a BET specific surface area of 80 m²/g, grade TF, made by Toyo Denka Co., Ltd.
*4Commercial precipitated calcium carbonate having a BET specific surface area of 30 m²/g, grade "Hakuenka CC", made by Shiraishi Kogyo K.K.
*5Commercial product, grade VN3, made by Nippon Silica Kogyo K.K.

EXAMPLE 1

Cores for British size golf balls (two-piece ball covered with ionomer resin) were prepared in the way mentioned later from the rubber compound of the above-mentioned recipe filled with colloidal calcium carbonate having a BET specific surface area of 80 m²/g. For comparison, cores were also prepared from the rubber compounds, each filled with commercial calcium carbonate having a BET specific surface area of 30 m²/g or white carbon (VN3, made by Nippon Silica Kogyo K.K.).

The cores and the golf balls having the cores were evaluated with respect to compression strength, rebound height, and compression. For comparison, three kinds of commercial British size balls (two-piece type) were evaluated in the same way. The results are shown in Table 1.

The process used for producing the cores is given below.

Polybutadiene rubber was blended with all the components except dicumyl peroxide by using a 16-inch roll. After cooling by standing, the rubber was further blended with dicumyl peroxide at a temperature lower than 100° C. (Barium sulfate is intended to adjust the weight of the golf ball to 44.6 to 45.8 g. Zinc oxide is intended to promote the vulcanization by dicumyl peroxide. Stearic acid is used to aid in the dispersion of the filler. Sulfur performs covulcanization.)

The compound was then extruded into a continuous round rod, 20 to 25 mm (0.78 to 0.98 inch) in diameter.

The extrudate was cut in lengths, each piece weighing 38.5±0.3 g (1.41±0.01 oz) equivalent to the weight of one core. The cut piece was placed in a split mold having a spherical cavity, 38.5 mm (1.52 inch) in diameter. For vulcanization, the mold was held between upper and lower hot plates heated at 158±5° C., under the pressure of 80 kg/cm² and up, for 30 minutes. After demolding, the molded piece was deflashed by using a centerless grinder and made into a complete sphere 37.3 mm in diameter (with a tolerance less than 0.1 mm). The ground surface had proper roughness for adhesion of ionomer resin as the skin layer.

The core thus produced was subsequently covered with the skin layer made of an ionomer resin composition of the following formulation.

| Surlyn 1555 | 50 parts by weight |
| Surlyn 1605 | 50 parts by weight |
| Titanium oxide | 1 parts by weight (anatase type) |
| Total | 101 parts by weight |
| Melt index | 6.0 |

("Surlyn" is a trade name given to ionomer produced by Du Pont. Surlyn comes in several grades: 1555, 1605, and 1708 having the sodium ion bond, and 1557 and 1706 having the zinc ion bond. They can be used individually or in combination with one another so that the composition has a melt index of 1.9 to 10.0, preferably 2.1 to 6.0, as measured according to ASTM D1238. Clear ionomer is whitened with anatase-type titanium oxide.)

The skin layer was formed by filling the space between the cavity wall and the core placed in the cavity. The filling was accomplished by injection molding at a stock temperature of 180° to 200° C., preferably 190° C., by using a 50-mm screw injection molding machine. Prior to injection molding, the core was held afloat in the cavity with three to five support pins, 3 to 5 mm in diameter. The cavity has an inside diameter of 43.1 mm or 41.5 mm for American size balls or British size balls, respectively. After injection, the mold was cooled for 10 to 60 seconds, followed by demolding.

The thus molded golf balls were deflashed with an endless sandpaper or centerless grinder and then matte-finished by vibrating with an abrasive or by wet sand-blasting. After finish coating, there were obtained golf balls.

The carry and run these golf balls achieve when hit at a speed of 40 m/sec by the above-mentioned tester were measured. The results are shown in Table 1.

As Table 1 shows, the British size golf balls of this invention are comparable to or superior to those in Comparative Example of Prior Art and commercial products A, B, and C with respect to carry, compression strength, and compression.

EXAMPLE 2

American size golf balls were prepared in the way as mentioned below. For comparison, American size golf balls were also prepared by using commercial calcium carbonate having a BET specific surface area of 30 $m^2/g$ or white carbon VN3.

The blending and extrusion were carried out in the same way as in Example 1. The extrudate was cut to lengths, each piece weighing 36.5±0.3 g (1.33±0.01 oz). The cut piece was placed in a split mold having a spherical cavity, 39.5 mm (1.56 inch) in diameter. Vulcanization was carried out in the same way as in Example 1. After demolding, the molded core was ground by a centerless grinder and made into a complete sphere 38.1 mm in diameter (with a tolerance less than 0.1 mm). The skin layer was formed in the same way as in Example 1 by using a mold 43.1 mm in diameter. After finish coating, there were obtained golf balls. The thus obtained golf balls were evaluated in the same manner as in Example 1. The results are shown in Table 2.

TABLE 1

| | Invention | | | | | Comparative Example of prior art | | | | | | Commercial golf balls (British size) | | |
|---|---|---|---|---|---|---|---|---|---|---|---|---|---|---|
| Performance of core | | | | | | | | | | | | | | |
| Filler (grade name) | TF | TF | TF | TF | TF | PC | PC | PC | VN3 | VN3 | VN3 | A*1 | B*2 | C*3 |
| Quantity of filler (parts by weight) | 10 | 15 | 30 | 40 | 50 | 15 | 30 | 40 | 15 | 30 | 40 | | | |
| Rebound height, cm (JIS S7005) | 97 | 98 | 98 | 97 | 97 | 99 | 99 | 97 | 80 | 78 | 72 | 98 | 97 | 97 |
| Compression strength, kg-f | 800 | 7300 | >9950 | >9950 | >9950 | 550 | 550 | 700 | 800 | 3500 | 4000 | 1200 | 3700 | 4000 |
| Surface hardness, Shore D (ASTM D2240) | 48 | 50.5 | 51 | 51 | 52 | 38 | 38 | 38 | 49 | 53 | 54 | 50 | 50 | 52 |
| Performance of golf ball | | | | | | | | | | | | | | |
| Carry, m | 167 | 167 | 167 | 166 | 165 | 168 | 168 | 168 | 157 | 157 | 154 | 171 | 166 | 166 |
| Run, m | 8.2 | 8.2 | 8.5 | 8.0 | 8.0 | 8.0 | 8.2 | 8.1 | 7.5 | 8.2 | 8.1 | 8.0 | 8.5 | 8.2 |
| Compression strength, kg-f | 2500 | >9950 | >9950 | >9950 | >9950 | 1100 | 1300 | 1350 | 2700 | 4100 | 4200 | 2800 | 7000 | 7410 |
| Compression *4 | 94 | 97 | 98 | 98 | 100 | 71 | 71 | 72 | 95 | 100 | >100 | 99 | 100 | >100 |
| Weight, g | 44.8 | 45.0 | 45.2 | 45.4 | 45.7 | 44.8 | 45.2 | 45.7 | 44.6 | 45.1 | 45.5 | 45.3 | 45.4 | 45.4 |

*1 Spalding, TOPFLITE XL
*2 Sumitomo Rubber Co., Ltd., DDH
*3 Bridgestone Tire Co., Ltd., ALTUS
*4 "Compression" is a measure to express the performance of golf balls which is accepted by PGA (Professional Golfers' Association). It is determined as follows with an instrument available from Atti Engineering Corp. in U.S.A. A golf ball under test is pressed 0.2 inch (5 mm) against a coil spring which compresses when subjected to a load greater than 200 lbs (91 kg). If the coil spring compresses 0.2 inch (5 mm), the compression of the golf ball is rated at 100; and if the coil spring compresses 0.1 inch (2.5 mm), the compression of the golf ball is rated at 0.

TABLE 2

| | Invention | | | | Comparative Example of prior art | | | | | | Commercial golf balls (American size) | | |
|---|---|---|---|---|---|---|---|---|---|---|---|---|---|
| Performance of core | | | | | | | | | | | | | |
| Filler (grade name) | TF | TF | TF | TF | PC | PC | PC | VN3 | VN3 | VN3 | A*1 | B*2 | C*3 |
| Quantity of filler (parts by weight) | 5 | 10 | 15 | 20 | 5 | 15 | 20 | 5 | 15 | 20 | | | |
| Rebound height, cm (JIS S7005) | 98 | 99 | 99 | 99 | 99 | 100 | 100 | 85 | 80 | 79 | 100 | 98 | 98 |
| Compression strength, kg-f | | | | | 500 | 550 | 720 | 800 | 2100 | 3800 | 1500 | 3600 | 5000 |
| Surface hardness, Shore D (ASTM D2240) | 47 | 49 | 49.5 | 50 | 36 | 36 | 36 | 47 | 51 | 52 | 49.5 | 50 | 51 |
| Weight, g | 34.0 | 34.3 | 34.6 | 34.8 | 34.0 | 34.5 | 34.8 | 34.2 | 34.3 | 34.6 | | | |
| Performance of golf ball | | | | | | | | | | | | | |
| Carry, m | 176 | 176 | 176 | 176 | 176 | 175 | 176 | 164 | 164 | 162 | 176 | 176 | 174 |
| Run, m | 8.5 | 9.0 | 9.0 | 9.0 | 9.0 | 8.5 | 9.0 | 9.0 | 9.0 | 8.5 | 9.0 | 9.0 | 9.2 |
| Compression strength, | 2500 | >9950 | >9950 | >9950 | 1000 | 1300 | 1400 | 2700 | 3400 | 4000 | 3000 | 7200 | >9950 |

TABLE 2-continued

| | Invention | | | | Comparative Example of prior art | | | | | | Commercial golf balls (American size) | | |
|---|---|---|---|---|---|---|---|---|---|---|---|---|---|
| kg-f Compression | 80 | 95 | 100 | >100 | 60 | 66 | 67 | >100 | >100 | >100 | 100 | >100 | >100 |
| Weight, g | 45.1 | 45.2 | 45.4 | 45.8 | 45.1 | 45.4 | 45.8 | 45.0 | 45.4 | 45.7 | 45.3 | 45.5 | 45.3 |

*[1]Spalding, TOPFLITE XL
*[2]Sumitomo Rubber Co., Ltd., DDH
*[3]Bridgestone Tire Co., Ltd., ALTUS As Table 2 shows, the American size golf balls of this invention are comparable to or superior to those in Comparative Example and commercial products A, B, and C with respect to rebound height, compression strength, and compression.

While the invention has been described in detail and with reference to specific embodiment thereof, it will be apparent to one skilled in the art that various changes and modifications can be made therein without departing from the spirit and scope thereof.

What is claimed is:

1. A golf ball in the shape of a sphere comprising a rubber composition filled with 15 to 50 parts by weight of calcium carbonate based on 100 parts by weight of the rubber, wherein the calcium carbonate is of ultrafine paticles having a BET specific surface area of 60 to 300 m$^2$/g and a particle diameter of 0.035 to 0.010 micrometers, whereby said golf ball has a compression strength greater than 7000 kg-f according to ASTM D-575 and a rebound height greater than 90 cm when dropped from a height of 120 cm on a steel plate, according to JIS S7005-1955.

* * * * *